(No Model.)

J. G. THOMAS.
COMMUNION SERVICE.

No. 516,065. Patented Mar. 6, 1894.

Witnesses

Inventor
John G. Thomas.
By L. Deane
his Attorney

THE NATIONAL LITHOGRAPHING COMPANY,
WASHINGTON, D. C.

UNITED STATES PATENT OFFICE.

JOHN G. THOMAS, OF LIMA, OHIO.

COMMUNION-SERVICE.

SPECIFICATION forming part of Letters Patent No. 516,065, dated March 6, 1894.

Application filed August 2, 1893. Serial No. 482,186. (No model.)

*To all whom it may concern:*

Be it known that I, JOHN G. THOMAS, a citizen of the United States, residing at Lima, in the county of Allen and State of Ohio, have invented certain new and useful Improvements in Communion-Service; and I do hereby declare the following to be a full, clear, and exact description of the invention, such as will enable others skilled in the art to which it appertains to make and use the same.

Figure 1:
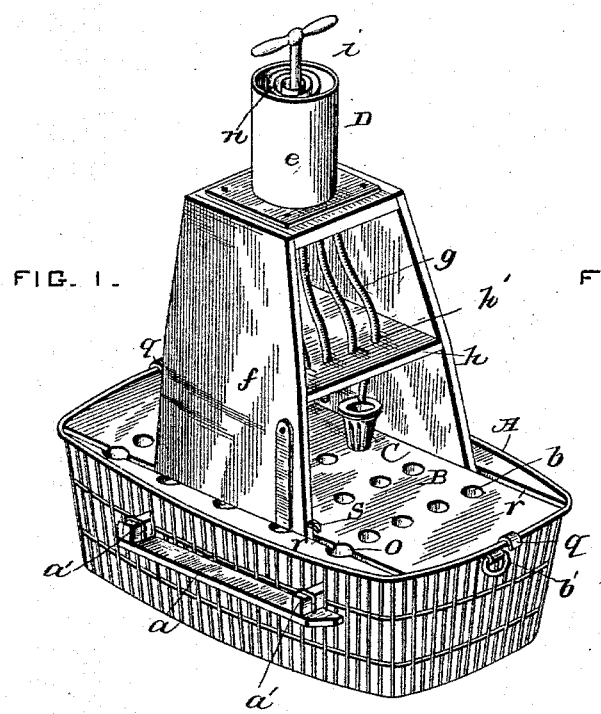
Figure 3:
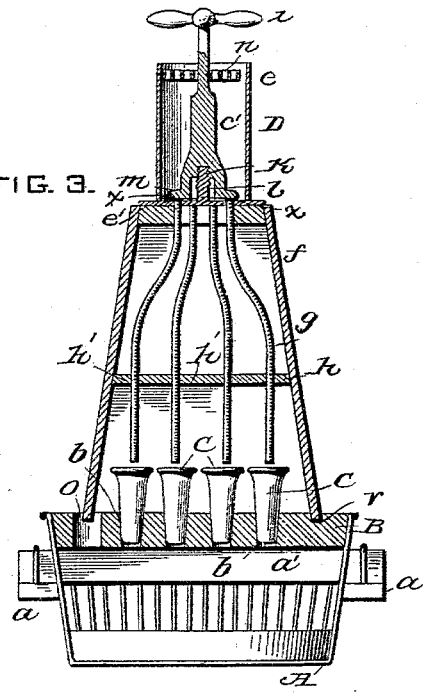
Figure 2:
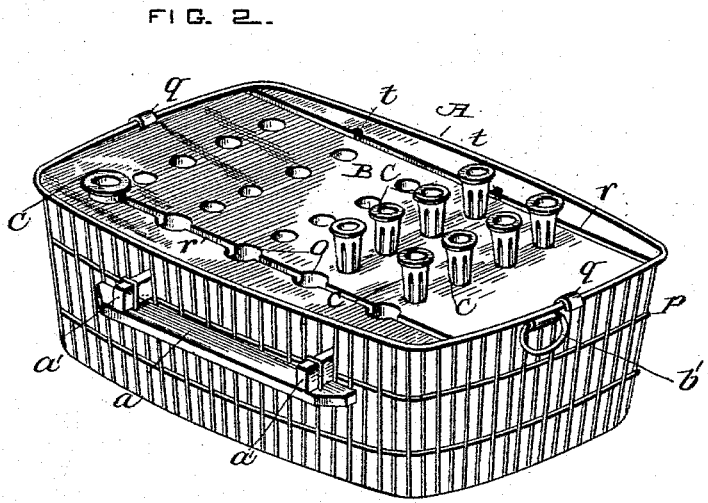
Figure 4:
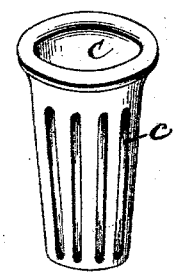
Figure 5:
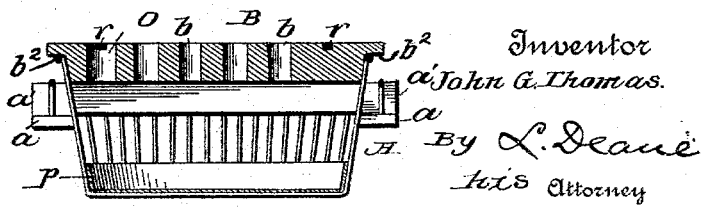

Figure 1, is a perspective view of this invention as an entirety, the front of the filler frame removed. Fig. 2, is a like view of the cup bearing part of the device, enlarged. Fig. 3, is vertical central section of the filler. Fig. 4, is a detail of one of the cups. Fig. 5 is a cross section of the tray and rack placed in and on it.

The object of this invention is to provide an individual or separate cup for the use of each person at the celebration of the Lord's Supper, commonly called the communion service, and it consists in providing a tray or any suitable receptacle for the cups, and means for filling the several cups, and in the general structure of the several parts of the device, and in the invention as an entirety, all as will now be more fully set out and explained.

In the accompanying drawings A, denotes any suitable receptacle, tray, or dish in the top of which is removably placed a rack B, which has openings $b$, regularly arranged to hold cups C. These cups are of small size and usually adapted to hold about a gill. Each is of a somewhat conical shape so as to be adapted for ready insertion into or removed from one of the openings $b$. By reason of the peculiar shape of each it projects high enough above the upper surface of the rack, as to be easily grasped between the thumb and fore finger.

In order to fill the cups there is provided the filling device D. This consists of a vessel $e$, placed on a support or frame $f$, preferably having flaring sides. To the perforations $e'$, in bottom of the vessel any desired number of tubes $g$, preferably of rubber, are attached which at their lower ends are so stretched apart and placed in the perforations $h'$ in the diaphragm $h$, of the frame as that each shall be exactly adapted to come directly over one of the cups placed in the tray opening below. When the filler is placed over the cups the several pipes being directly over the several cups, the wine in the vessel $e$, is let into the tubes by giving a sharp and short turn on the handle $i$, that extends over the top of the vessel, this movement serves, under the action of the screw thread $k$, on the inside of the hollow end of the shaft of handle $i'$, which fits on the screw threaded spindle $l$, upwardly projecting from the base of the cup, to raise the shaft slightly, and thus the disk $m$, at its lower end is raised high enough above the bottom of the cup to allow the escape of a slight portion of wine through the perforated base $e'$, into each pipe. The handle on being released is returned to its normal position by means of the spiral spring $n$, one end attached to it and the other to the side of the cup, and the disk is thus moved down on the bottom of the vessel and the exits closed. The packing $x$, on the edges of the disk insures a tight closure.

The operation of filling the cups may take place before the communion services, or at the time. When the cups are filled the tray can be passed round and each communicant is expected to take one of the cups. When he has partaken of the wine, the cup may be returned to its opening, or can be put through the large opening $o$, in one side of the rack. If there is any wine in this cup it can safely flow into the pan $p$, under the rack.

The rack can be detachably held in the top of the tray by means of a snap spring $q$, one at each end of the tray, the body of which projects sufficiently over the ends of the tray to hold it.

The rack may be made of any desired superficial size, the tray being of like size, to hold any desired number of cups. Of course the number of tubes in the filler may be as many as desired.

By means of the grooves $r$, on each side of the tray, in which the ends of the frame can be placed, the filler may be moved along over the top of the tray, and as the number of cups corresponding with the number of tubes has been filled, the filler is moved along and the next set can be filled. These movements of the filler over the tops of the cups can be regulated by the gage s, which is a finger pivoted to the lower part of the frame on the inside. The lower end of one of the fingers coming in contact with the stops t, placed at regular intervals in one of the grooves regulates the extent of the movement of the filler, and insures its proper position at each movement over the set of cups under it.

The ribs c, on the side of the cup C, are merely external ornamentation.

At each side of the tray is attached a handle piece a, made in any desired way; as now illustrated this serves to hold the cross strips a', which pass from side to side of the tray and support the rack B. But in Fig. 5, is shown a modification of method of resting the rack on the edges of the tray, namely by means of the rabbet $b^2$, on its edges which rest upon the upper rim or edge of the tray.

If desired the tray may have handles b', of any desired shape or size at each end.

Of course it will be understood that the tray may be made of wire, thin metal or in any way or shape it may seem best for neat and seemly appearance, as well as cheapness of manufacture.

What I claim is—

1. The filling device, above described, consisting of a vessel to hold the wine, supported on a suitable frame, and having a perforated bottom, a pipe attached to each of the perforations in said bottom, and an interior spring actuated and handled disk covering all said perforations, whereby all of them can be simultaneously opened or closed.

2. In combination with the tray and the rack therein and the frame supported thereby and having flaring sides and perforated diaphragm h, the filling vessel placed on said frame, and provided with a perforated bottom and a pipe or tube connected with each perforation and stretched apart to pass through the perforations in the diaphragm h, and a spring actuated disk inside said filler to cover all the entrances to said pipes.

3. The tray A, having the rack B, attached to it by springs, combined with the wine filling device placed on a frame movable back and forth in grooves in said rack, substantially as set forth.

4. The combination of the tray, the rack supported by it and detachable from it at pleasure, the frame having flaring sides and a perforated diaphragm, the filling vessel having a perforated bottom and spring actuated and handled disk to cover all said perforations, substantially as set forth.

5. The filling device D, consisting of vessel e, having a perforated bottom and a pipe or tube attached to each perforation in said bottom, and a spring actuated disk covering said perforations and the packing x, under said disk, substantially as described.

6. In combination with the tray and the rack thereon having grooves at the sides and stops thereby, the frame carrying the filling device, and having on its inside gage s, adapted to come in contact with the said stops, substantially as and for the purposes set forth.

In testimony whereof I affix my signature in presence of two witnesses.

JOHN G. THOMAS.

Witnesses:
ROBERT PEAT,
ABNER JONES.